(12) United States Patent
Watanabe et al.

(10) Patent No.: US 9,128,590 B2
(45) Date of Patent: Sep. 8, 2015

(54) CONTENTS DISPLAY DEVICE AND CONTENTS DISPLAY METHOD

(75) Inventors: Takashi Watanabe, Osaka (JP);
Tetsuhiro Kaya, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 406 days.

(21) Appl. No.: 13/166,822

(22) Filed: Jun. 23, 2011

(65) Prior Publication Data

US 2011/0316801 A1 Dec. 29, 2011

(30) Foreign Application Priority Data

Jun. 23, 2010 (JP) ................................ 2010-142318

(51) Int. Cl.
*G06F 3/0483* (2013.01)
*G06F 3/0488* (2013.01)

(52) U.S. Cl.
CPC .......... *G06F 3/0483* (2013.01); *G06F 3/04883* (2013.01); *G06F 2203/04808* (2013.01)

(58) Field of Classification Search
USPC .......................................... 345/173; 715/863
See application file for complete search history.

(56) References Cited

U.S. PATENT DOCUMENTS

| 2009/0201268 A1* | 8/2009 | Endo et al. ..................... 345/174 |
| 2011/0050594 A1* | 3/2011 | Kim et al. ..................... 345/173 |
| 2011/0209104 A1* | 8/2011 | Hinckley et al. .............. 715/863 |

FOREIGN PATENT DOCUMENTS

JP 2007-018095 A 1/2007

* cited by examiner

*Primary Examiner* — Kent Chang
*Assistant Examiner* — Nathan Brittingham
(74) *Attorney, Agent, or Firm* — James W. Judge (57) ABSTRACT

A contents display device includes a display section, a touch detection section, and a control section. The control section includes: a bookmarking determination section for determining, if multiple contacts have been simultaneously detected by the touch detection section, at least one contact among the multiple contacts to be a bookmark; a bookmark-position configuration section for configuring a bookmark position, based on a contact determined by the bookmarking determination section to be a bookmark; and a return-to-bookmark-position determination section for determining, after a bookmark position has been configured by the bookmark-position configuration section, to return the content displayed on the display section to the bookmark position, based on a contact detected by the touch detection section. When the return-to-bookmark-position determination section determines to return to the bookmark position, the content displayed on the display section is returned to the bookmark position.

5 Claims, 9 Drawing Sheets

FIG. 9 PRIOR ART
ELECTRONIC DISPLAY DEVICE 10

CONTENTS DISPLAY DEVICE AND CONTENTS DISPLAY METHOD

BACKGROUND OF THE INVENTION

1. Field of the Invention

The present invention relates to contents display devices and contents display methods for displaying content; and more specifically relates to contents display devices and contents display methods using touch panels.

2. Description of the Background Art

Digital book display devices for browsing digital books and the like include, for example, casings formed in approximately thin-box shapes, display sections such as LCDs (liquid crystal displays) and the like, digital book display devices for browsing digital books and the like. The digital book display devices often include operation sections adjacent to the display sections.

Digital book information is either stored in storage sections (RAM, HDD, etc.) built into the casings to be read-out, or stored in generic storage media (memory cards, etc.) to be read-out when the storage media are inserted in insertion parts provided on the casings and are electrically connected to the devices.

With such digital book display devices, for example, information in a single page or a two-page spread of a digital book is displayed on a display section as an image, and turning forward or backward a page of the digital book is conducted page by page when a user operates an operation section in the vicinity of or on a display screen.

Furthermore, when there are pages configured with bookmarks, some conventional digital book display devices for displaying contents of digital books and some software incorporated in the digital book display devices can display, as a list, strings of characters within a predetermined character number range from the heads of those pages including the bookmarks. The user operates a button in the operation section in the vicinity or on the display screen, and selects a desirable bookmark from the list. As a result, a page configured with the bookmark selected by the user is displayed, and the user can start reading contents of the digital book from the page (cf., Japanese Laid-Open Patent Publication No. 2007-18095).

Figure 9:
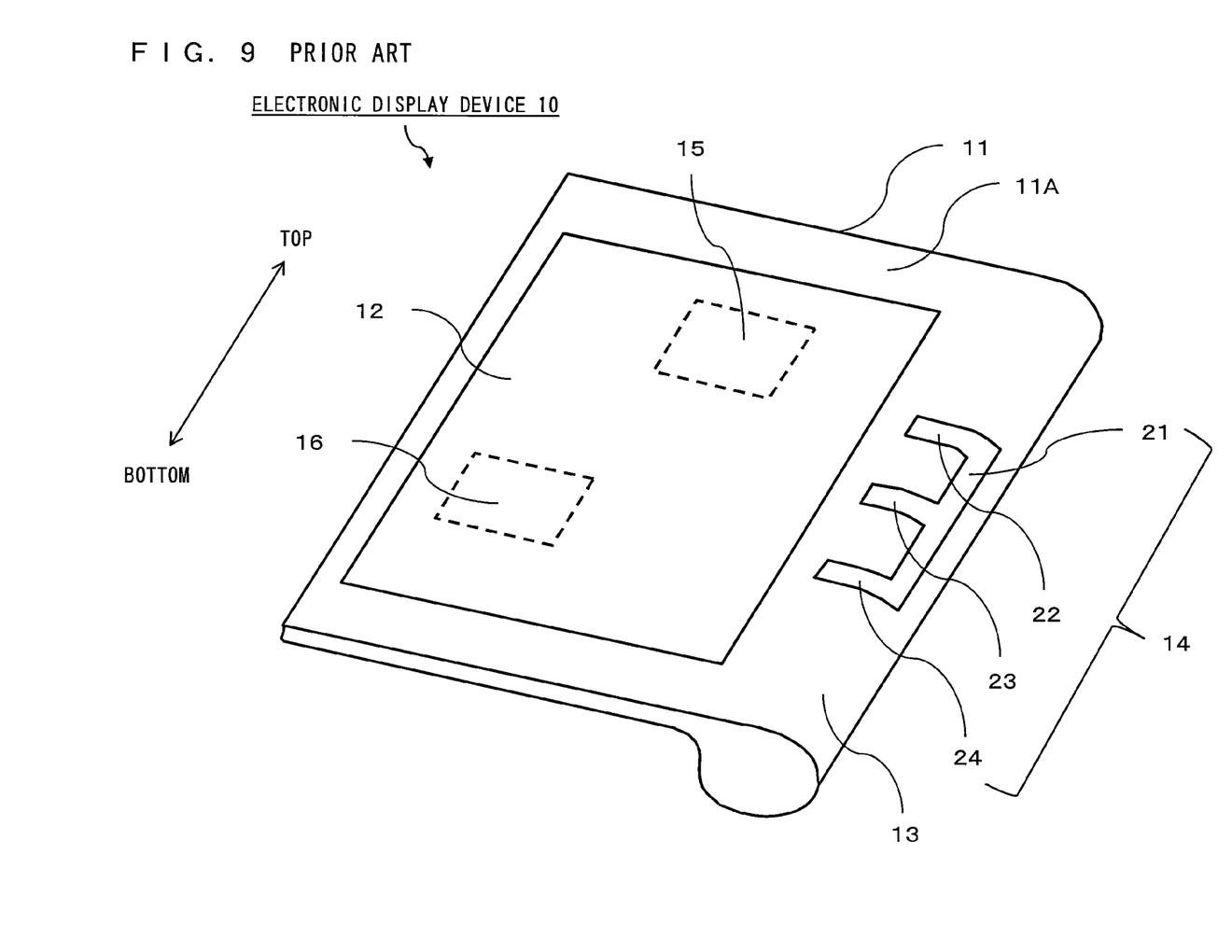
FIG. 9 is a perspective diagram showing a conventional electronic display device 10.

FIG. 9 is a perspective diagram showing a conventional electronic display device 10. In FIG. 9, the electronic display device 10 includes a casing 11, an approximately-rectangular display section 12 which is used longwise and is provided on a surface 11A of the casing 11, an operation section 14 provided on a holding part 13 of the casing 11, a storage section 15 storing information that is displayed on the display section 12, and a control section 16 for displaying information on the display section 12. As a result of a user operating the operation section 14, the control section 16 switches the display of the display section 12.

The operation section 14 includes a first touch-slide surface 21 formed in a direction parallel to the top-bottom direction (longitudinal direction) of the display section 12. Furthermore, the operation section 14 includes, adjacent to the first touch-slide surface 21, second to fourth touch-slide surfaces 22 to 24 which are sequentially spaced having a constant interval in the top to bottom direction and which are formed in a direction orthogonal to the top-bottom direction (longitudinal direction).

When a digital book is to be displayed on the electronic display device 10, first, power of the electronic display device 10 is turned ON, and a menu is displayed on the display section 12. Then, the user selects "books" from the menu displayed on the display section 12 by operating the first touch-slide surface 21 of the operation section 14, and further confirms the selection "books" by operating the third touch-slide surface 23.

When the user confirms "book" information by operating the third touch-slide surface 23 of the operation section 14 after having inserted a memory card in the electronic display device 10, multiple "titles" are displayed on the display section 12. Then, the user operates the first touch-slide surface 21 of the operation section 14 to select a desired "title" and confirms the selection by operating the third touch-slide surface 23.

Furthermore, in addition to the titles displayed on the display section 12, "read," "table of contents," "bibliography," and "bookmark" are displayed on the display section 12.

For example, when the user operates the first touch-slide surface 21 of the operation section 14 to select "read," the content of a written work selected by the user is displayed on the display section 12.

Furthermore, when turning a page, the user touches the second touch-slide surface 22 and slides his/her finger from the right side to the left side in a direction orthogonal to the top-bottom direction of the display section 12. As a result, the page can be turned in the right to left direction in accordance with the touch-slide direction. In addition, when the user touches the second touch-slide surface 22 and slides his/her finger from the left side to the right side, the page can be turned in the left to right direction. In this way, the user is able to have an intuitive operability as if actually turning pages of a paper book.

Furthermore, when the user selects "bookmark" displayed on the display section 12 by operating the first touch-slide surface 21 of the operation section 14, "bookmarking" and "list" are displayed on the display section 12 as the content of "bookmark." Furthermore, among the displayed "bookmarking" and "list," the user selects "bookmarking" by operating the first touch-slide surface 21 of the operation section 14, and confirms the selection "bookmarking" by operating the third touch-slide surface 23. As a result, bookmarked contents are displayed on the display section 12.

Generally with paper books, there are cases where the user inserts a hand (finger) or bookmark at a portion that is currently being read in order to temporarily examine pages before or after the portion that is currently been read. Furthermore, the user often returns to the original place where the hand (finger) or bookmark has been inserted, after examining earlier or later pages.

Therefore, even on digital book display devices for browsing digital books, it would be desirable if the user could conduct operations of inserting a hand (finger) or bookmark at a portion that is currently being read and return to the original place where the hand (finger) or bookmark has been inserted after examining earlier or later pages, to provide a sensation as if conducting the operations on paper books.

In conventional digital book display devices, although the user can switch screens displayed on the display section by holding down buttons on the operation section or the like, the user can hardly have a sensation as if actually conducting the operating by himself/herself and cannot conduct the operation intuitively.

Furthermore, although the user can have an intuitive operability for turning pages with the electronic display device 10 in FIG. 9 as if turning pages of paper books; for bookmarking, the user selects "bookmarking" by operating the first touch-slide surface 21 and confirms the selection "bookmarking" by operating the third touch-slide surface 23, and thereby the user cannot have an intuitive operability as if handling paper books such as inserting a hand (finger) or bookmark, for example.

SUMMARY OF THE INVENTION

The present invention has been made in view of the problem described above, and an object of the present invention is to provide contents display devices and contents display methods capable of providing a user with an intuitive operability as if handling paper books, by having a bookmark position configured on a currently browsed portion of content displayed on a display section, and returning the display to the configured bookmark position after the user examines earlier or later portions.

In order to achieve the above described object, a contents display device of the present invention is a contents display device for displaying content, including: a display section on which content is displayed; touch detection section, superposed on the display section, for detecting contact instances that operate content displayed on the display section; and a control section for controlling the contents displayed on the display section, based on contact instances detected by the touch detection section. The control section includes: a bookmarking determination section for determining, if multiple contact instances have been simultaneously detected by the touch detection section, at least one contact instance among the multiple contact instances to be a bookmark; a bookmark-position configuration section for configuring a bookmark position in the content displayed on the display section, based on a contact instance determined by the bookmarking determination section to be a bookmark; and a return-to-bookmark-position determination section for determining, after a bookmark position has been configured by the bookmark-position configuration section, to return the content displayed on the display section to the bookmark position, based on a contact instance detected by the touch detection section. When the return-to-bookmark-position determination section determines to return to the bookmark position, the content displayed on the display section is returned to the bookmark position configured by the bookmark-position configuration section.

Preferably, the control section scrolls the content displayed on the display section, based on contact instances detected by the touch detection section.

Preferably, if two contact instances are simultaneously detected by the touch detection section and one of the two contact instances satisfies a predetermined stationary condition, the bookmarking determination section determines, to be a bookmark, the contact instance which satisfies the predetermined stationary condition.

Preferably, if multiple contact instances are simultaneously detected, the touch detection section samples coordinate position of the multiple contact instances multiple times within a predetermined time period. Preferably, the predetermined stationary condition is defined as there being no changes in coordinate position having been sampled for multiple times.

Preferably, with regard to a contact instance determined by the bookmarking determination section to be a bookmark, during the interval a contact instance is maintained, the bookmark-position configuration section continues maintaining the bookmark position configured based on the contact instance, and when the contact is broken, the bookmark-position configuration section releases the bookmark position configured based on the contact.

Furthermore, preferably, with regard to a contact instance determined by the bookmarking determination section to be a bookmark, during the interval a contact instance is maintained, the control section scrolls the content displayed on the display section, based on other contact instances not having been determined by the bookmarking determination section to be a bookmark.

In order to achieve the above described object, a contents display method of the present invention is a contents display method executed by a contents display device for displaying content on a display section. The contents display method includes: a touch detection step of detecting a contact instance that operates content displayed on the display section; a bookmarking determination step of determining, if multiple contact instances have been simultaneously detected in the touch detection step, at least one contact instance among the multiple contact instances to be a bookmark; a bookmark-position configuration step of configuring a bookmark position in the contents displayed on the display section, based on a contact instance determined by the bookmarking determination step to be a bookmark; a return-to-bookmark-position determination step of determining, after a bookmark position has been configured in the bookmark-position configuration step, to return the content displayed on the display section to the bookmark position, based on a contact instance detected in the touch detection step; and a bookmark-position display step of returning the content displayed on the display section to the bookmark position configured in the bookmark-position configuration step, if a determination to return to the bookmark position has been made in the return-to-bookmark-position determination step.

Further, in order to achieve the above described object, processes performed by respective components of the contents display device of the present invention can be regarded as a contents display method that provides a series process steps. This method is provided in a form of a program causing a computer to execute the series of process steps. The program may be installed on the computer as being stored on a computer readable storage medium.

As described above, the contents display device and the contents display method of the present invention are capable of providing a user with an intuitive operability as if handling paper books, by having a bookmark position configured on a currently browsed portion of content displayed on the display section, and returning the display to the configured bookmark position after the user examines earlier or later portions.

The present invention is applicable to contents display devices and the like for displaying contents, and is particularly useful for contents display devices and the like in which touch panel are superposed on display screens and that are for operating display of digital books.

These and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention is described in the following with reference to the drawings.

Figure 1:
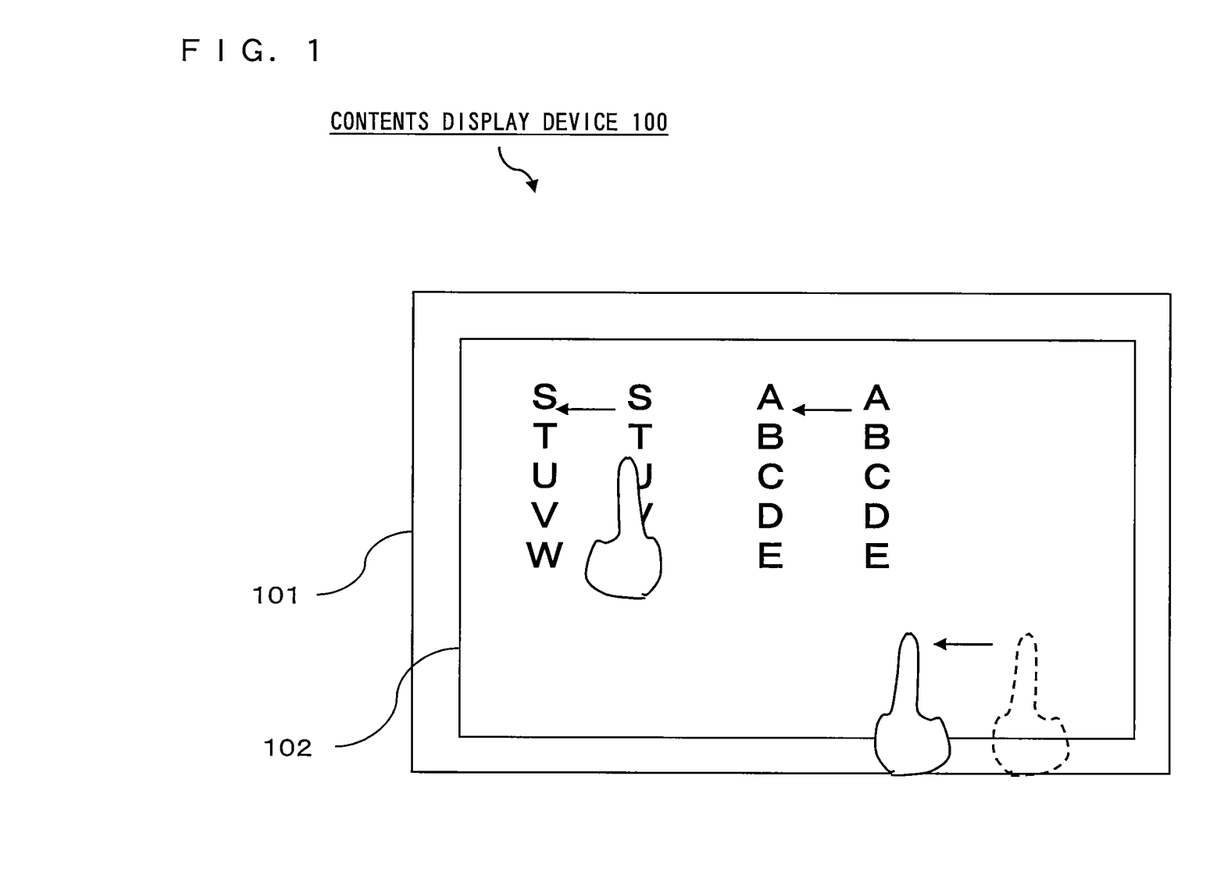
FIG. 1 schematically shows a display screen of a contents display device 100 according to one embodiment of the present invention.

FIG. 1 schematically shows a display screen of a contents display device 100 according to the one embodiment of the present invention. In FIG. 1, the contents display device 100 includes a display screen 101 and a touch panel 102.

The display screen 101 is, for example, a display screen includes a liquid crystal display (LCD) and the like; and content and an operation screen are displayed on the display screen 101.

The touch panel 102 is superposed on the front surface of the display screen 101, and enables the content displayed on the display screen 101 to be operated by having a user make contact thereto using a finger or a pen.

A control section (not shown) of the contents display device 100 controls the content and the operation screen displayed on the display screen 101 based on operations by the user using the touch panel 102. Details of the control section are described later.

Figure 2:
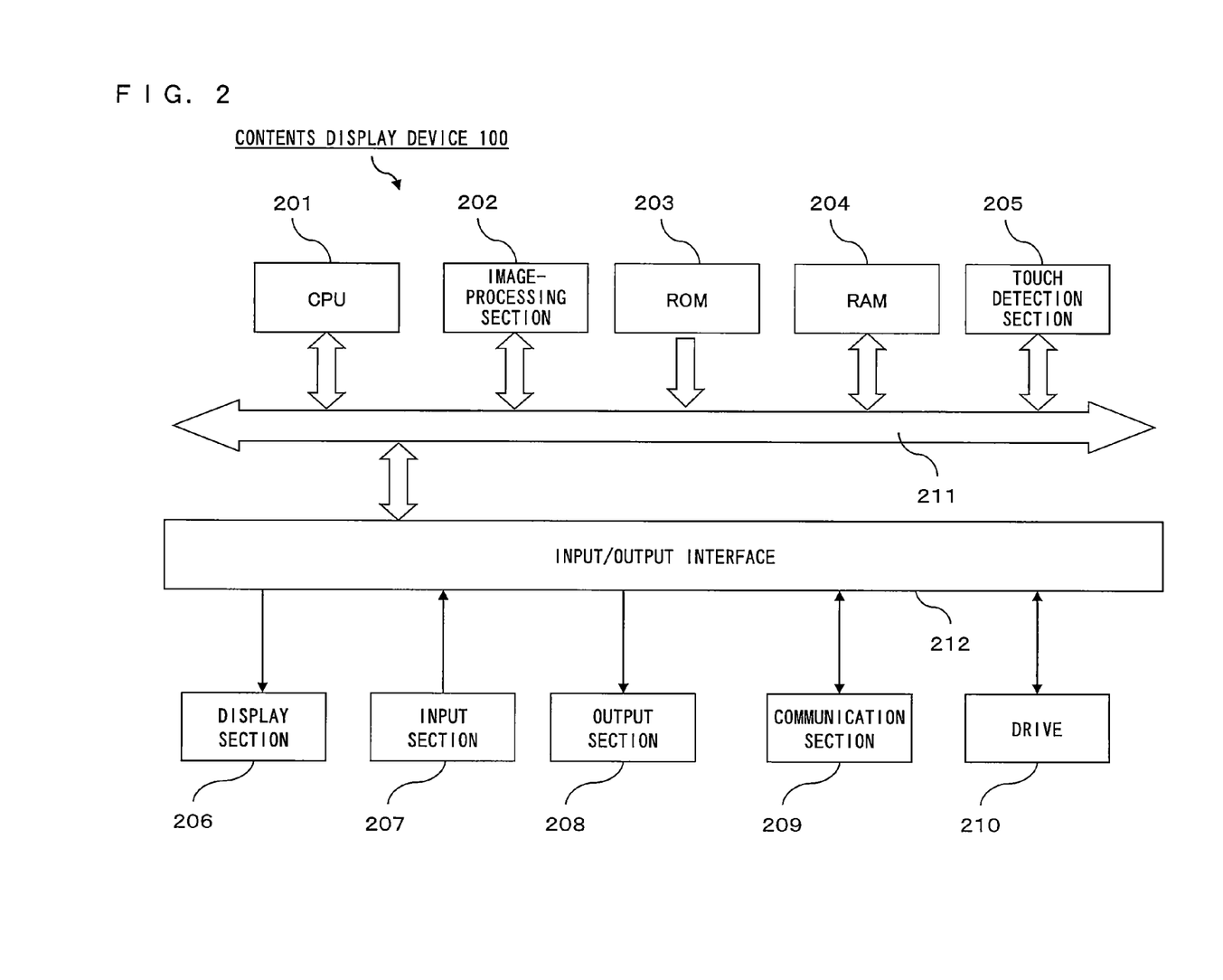
FIG. 2 is a schematic diagram showing the whole configuration of the contents display device 100 according to the one embodiment of the present invention.

FIG. 2 is a schematic diagram showing the whole configuration of the contents display device 100 according to the one embodiment of the present invention. In FIG. 2, the contents display device 100 includes a CPU (Central Processing Unit) 201, an image-processing section 202, a ROM (Read Only Memory) 203, a RAM (Random Access Memory) 204, a touch detection section 205, a display section 206, an input section 207, an output section 208, a communication section 209, and a drive 210.

The CPU 201, the image-processing section 202, the ROM 203, the RAM 204, and the touch detection section 205 are connected each other through a bus 211. The display section 206, the input section 207, the output section 208, the communication section 209, and the drive 210 are connected to each other through an input/output interface 212. The bus 211 and the input/output interface 212 are connected to each other.

The CPU 201 receives, through the input/output interface 212 and the bus 211, an input of data and process instructions which are inputted by the user using the input section 207. Based on the inputted process instructions and the like, the CPU 201 executes various processes in accordance with a program stored in the ROM 203 or a program loaded onto the RAM 204 from the touch detection section 205.

The image-processing section 202 is composed of, for example, a processor such as a digital signal processor (DSP) and the like, and generates image data to be displayed on the display section 206 based on a control of the CPU 201. Then, the image-processing section 202 provides the display section 206 with the generated image data via the bus 211 and the input/output interface 212. As a result, an image based on the provided image data is displayed on the display section 206.

Data includes programs and calculation parameters used by the CPU 201, and the ROM 203 basically stores fixed data.

The RAM 204 stores therein programs used based on the control of the CPU 201, and parameters and data that are changed as appropriate in accordance with the control.

The touch detection section 205 including the touch panel 102 shown in FIG. 1 detects an input operation of making contact with the touch panel 102 by using a finger or a pen, and transmits the detected data to the CPU 201.

Based on the data received from the touch detection section 205, the CPU 201 causes the image-processing section 202 to perform image processing, and outputs an image to the display section 206. Thus, the image is displayed on the display screen 101 shown in FIG. 1.

The input section 207 includes the touch panel 102 shown in FIG. 1, a mouse, a keyboard, a pointing device (e.g., a stylus pen etc.), or the like, and is operated by the user when inputting various instructions to the contents display device 100.

The output section 208 includes, for example, a loudspeaker and the like, and outputs voice, audio, and the like processed by the CPU 201.

The communication section 209 connects to the Internet through wired or wireless communication, and conducts communication with a server or the like connected to the Internet.

The drive 210 is connected to the input/output interface 212 if necessary. A removable medium including an optical disc, a magneto-optical disc, or a semiconductor memory is connected to the drive 210 as appropriate; and the driver 210 provides each section of the contents display device 100 with various data (e.g., book data, dictionary data, or the like) read out from the removable medium.

Figure 3:
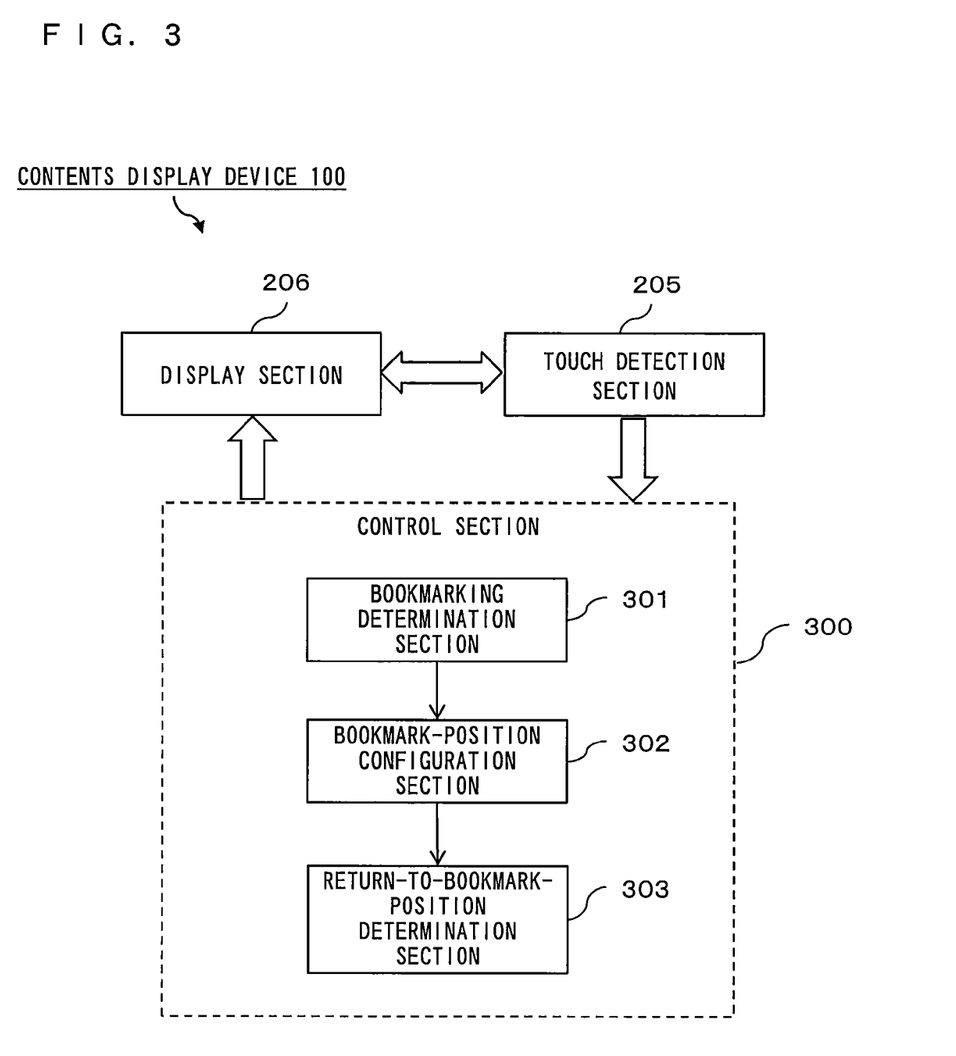
FIG. 3 is a diagram of a functional block achieving a bookmark function of the contents display device 100 according to the one embodiment of the present invention.

FIG. 3 is a diagram of a functional block achieving a bookmark function of the contents display device 100 according to the one embodiment of the present invention. In FIG. 3, the contents display device 100 includes the display section 206, the touch detection section 205, and a control section 300. The control section 300 includes a bookmarking determination section 301, a bookmark-position configuration section 302, and a return-to-bookmark-position determination section 303.

The display section 206 is the display screen 101 shown in FIG. 1, and content are displayed thereon.

The touch detection section 205 includes the touch panel 102 shown in FIG. 1, and is superposed on the display section 206. The touch detection section 205 detects a contact for operating the content displayed on the display section 206. Representatively, operations by fingers and pens contacting the touch panel 102 are detected.

The control section 300 is included in the CPU 201 shown in FIG. 2, and controls the content displayed on the display section 206 based on the contact detected by the touch detection section 205.

In more detail, when multiple contacts are simultaneously detected by the touch detection section 205, the bookmarking determination section 301 determines at least one contact among the multiple contact to be a bookmark. For example, in a case where a user's finger on the right hand and a user's finger on the left hand are both in contact with the touch panel 102, if a contact operation by the finger on the right hand is stationary, the contact by the finger on the right hand is determined to be a bookmark.

The bookmark-position configuration section 302 configures a bookmark position in the content displayed on the display section 206 based on the contact which is determined by the bookmarking determination section 301 to be a bookmark. For example, as described above, if a contact operation by the finger on the right hand is stationary, a position of the content in contact with the finger on the right hand is configured as a bookmark position among the content displayed on the display section 206.

Furthermore, the bookmark position configured based on the contact may be continuously maintained while the contact operation by the finger on the right hand is kept stationary. On the other hand, when the contact is released, the bookmark position configured based on the contact is released. In other words, having the contact operation by the finger on the right hand kept stationary corresponds to inserting a finger or a bookmark in a paper book. Furthermore, discontinuing the contact operation by the finger on the right hand corresponds to removing the inserted finger or bookmark from the paper book.

After the bookmark position is configured by the bookmark-position configuration section 302, the return-to-bookmark-position determination section 303 determines to return the content displayed on the display section 206 to the bookmark position, based on a contact detected by the touch detection section 205. For example, when the finger on the right hand, which has been in contact in a stationary manner, is slid slightly without being disengaged from the touch panel 102, it may be determined to return the content displayed on the display section 206 to the bookmark position. It should be noted that the operation of determining to return to the bookmark position is not limited to the operation of slightly sliding a finger without having it disengaged from the touch panel 102, and, for example, may be an operation of strongly pushing the touch panel 102 with the finger, which has been in contact in a stationary manner, once or more.

As described above, when the return-to-bookmark-position determination section 303 determines to return to the bookmark position, the control section 300 returns the content displayed on the display section 206 to the bookmark position configured by the bookmark-position configuration section 302.

Figure 4:
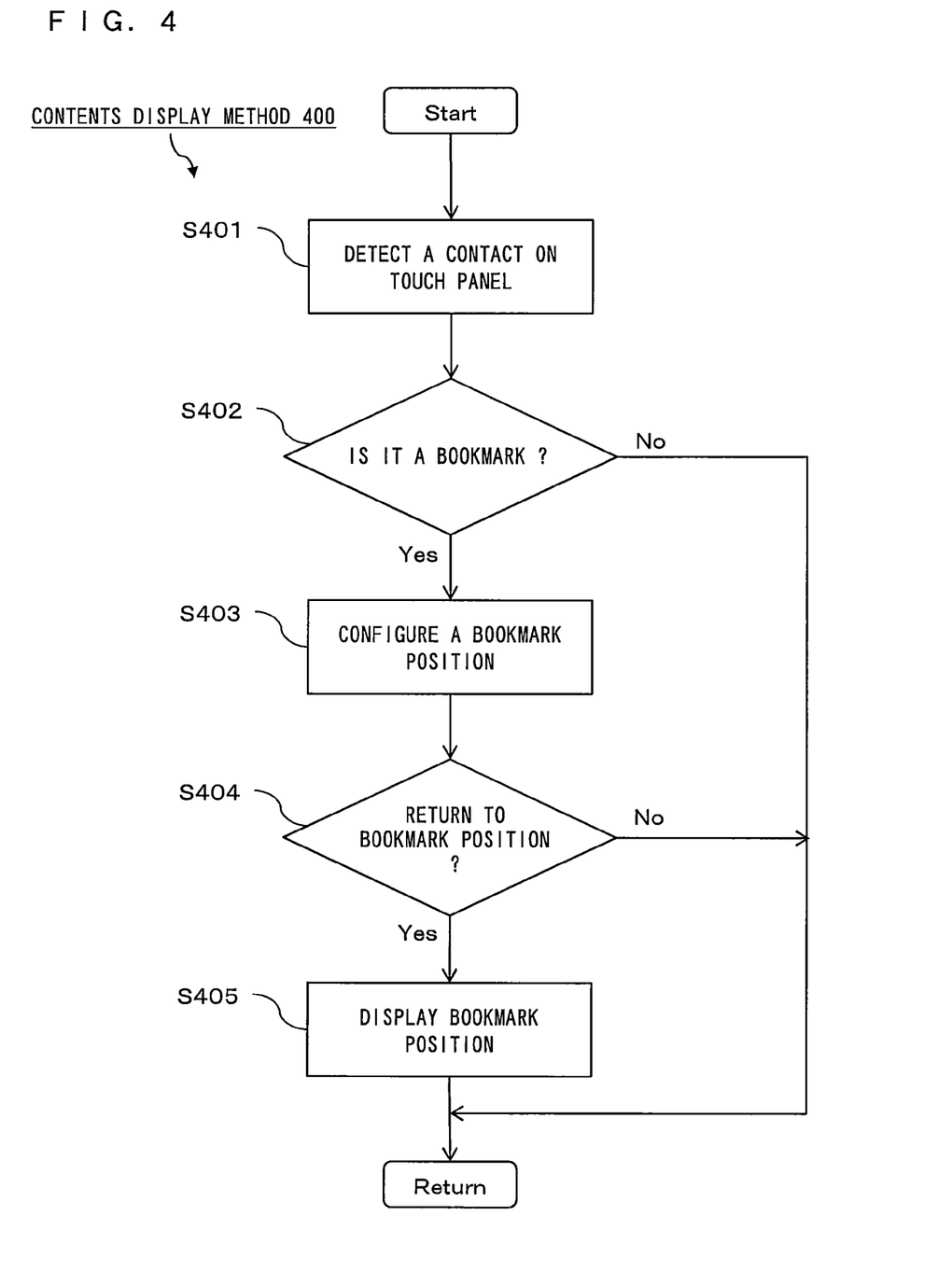
FIG. 4 is a flowchart showing a flow of processes of a contents display method 400 executed by the contents display device 100 according to the one embodiment of the present invention.

Processes of the bookmark function executed by the contents display device 100 according to the one embodiment of the present invention are described in detail next. FIG. 4 is a flowchart showing a flow of the processes of a contents display method 400 executed by the contents display device 100 according to the one embodiment of the present invention. In FIG. 4, the contents display method 400 includes a touch detection step S401, a bookmarking determination step S402, a bookmark-position configuration step S403, a return-to-bookmark-position determination step S404, and a bookmark-position display step S405.

At the touch detection step S401, the touch detection section 205 detects a contact for operating the content displayed on the display section 206. Specifically, the touch detection section 205 detects operating of the content or the operation screen displayed on the display screen 101 by a user using a finger or a pen via the touch panel 102.

Figure 5:
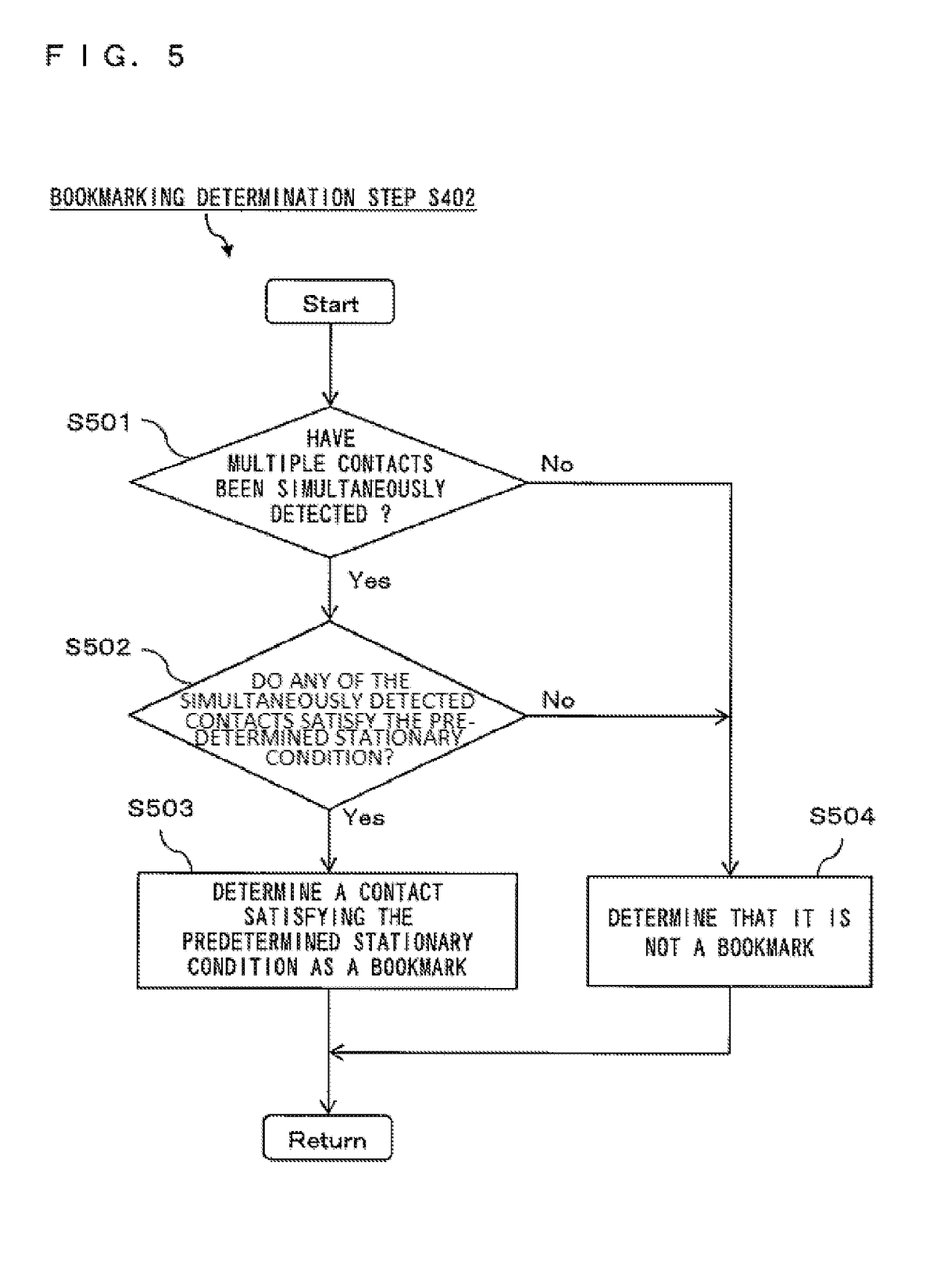
FIG. 5 is a flowchart showing one specific example of processes executed at a bookmarking determination step S402.

At the bookmarking determination step S402, the bookmarking determination section 301 determines whether or not the contact detected at the touch detection step S401 is a bookmark. FIG. 5 is a flowchart showing one specific example of the processes executed at the bookmarking determination step S402.

At step S501, the bookmarking determination section 301 determines whether or not multiple contacts are simultaneously detected at the touch detection step. Specifically, the bookmarking determination section 301 detects whether or not multiple points are in contact with the touch panel 102. Representatively, when the user operates the touch panel 102 by using fingers on the right hand and left hand, the bookmarking determination section 301 may determine whether or not there is more than one point in contact with the touch panel 102. It should be noted that the user may use a pen to operate the touch panel 102.

Furthermore, the touch panel 102 may be, for example, a projective type electrostatic capacitance touch panel or a resistive film type touch panel.

If it is determined that multiple contacts are simultaneously detected, the process advances to step S502 (Yes at step S501). On the other hand, if it is determined that multiple contacts are not simultaneously detect, i.e., if the contact is detected at a single point, the process advances to step S504 so as to determine not to conducted the operation of the bookmark function (No at step S501).

At step S502, the bookmarking determination section 301 determines whether or not a predetermined stationary condition is satisfied with regard to the simultaneously detected multiple contacts. Representatively, the bookmarking determination section 301 determines that a contact whose detected coordinate position is maintained at a single point without being changed for a predetermined time period is a contact satisfying the predetermined stationary condition. Furthermore, whether or not the detected coordinate position is maintained at a single point may be determined by sampling the detected coordinate position of the contact for multiple times within a predetermined time period. Furthermore, the bookmarking determination section 301 may determine that a pen or a finger of the user in contact with the touch panel 102 is a contact satisfying the predetermined stationary condition if the pen or finger stays within a certain range. A point in contact is determined as staying within a certain range if the point in contact is interpreted, in an actual touch-panel operation, as being maintained within a range without being moved at all.

Here, if any one of the simultaneously detected multiple contacts is determined to satisfy the predetermined stationary condition, the process advances to step S503 (Yes at step S502). On the other hand, if neither of the simultaneously detected multiple contacts is determined to satisfy the predetermined stationary condition, i.e., all the multiple contacts are moving, or if the stationary time period is shorter than the predetermined time period etc., the process advances to step S504 (No at step S502).

A contact determined to satisfy the predetermined stationary condition at step S502 is determined to be a bookmark by the bookmarking determination section 301 at step S503. Here, one or more contacts may be determined to be bookmarks. Cases having more than one contact include, for example, a case where the user makes contacts with the touch panel 102 by using the index finger and the middle finger of the left or right hand, and the contacts satisfy the predetermined stationary condition.

At step S504, the bookmarking determination section 301 determines that the operation to contact the touch panel 102 is not a bookmark. In other words, the content displayed on the screen may be controlled so as to be scrolled instead of having the bookmark function operated, in accordance with the touch-panel operation of the user.

If it is determined to be a bookmark at step S503, going back to the description of the flowchart in FIG. 4, the process advances to step S403 (Yes at step S402); and if it is determined as not a bookmark at step S504, the bookmark function is not operated (No at step S402).

At the bookmark-position configuration step S403, the bookmark-position configuration section 302 configures a bookmark position in the content displayed on the display section 206, based on the contact determined to be a bookmark at the bookmarking determination step S402. In more detail, if the contact is determined to satisfy the predetermined stationary condition at step S502 to be determined to be a bookmark at step S503, the bookmark position is configured to the content indicated by the coordinate position corresponding to the contact.

Figure 6:
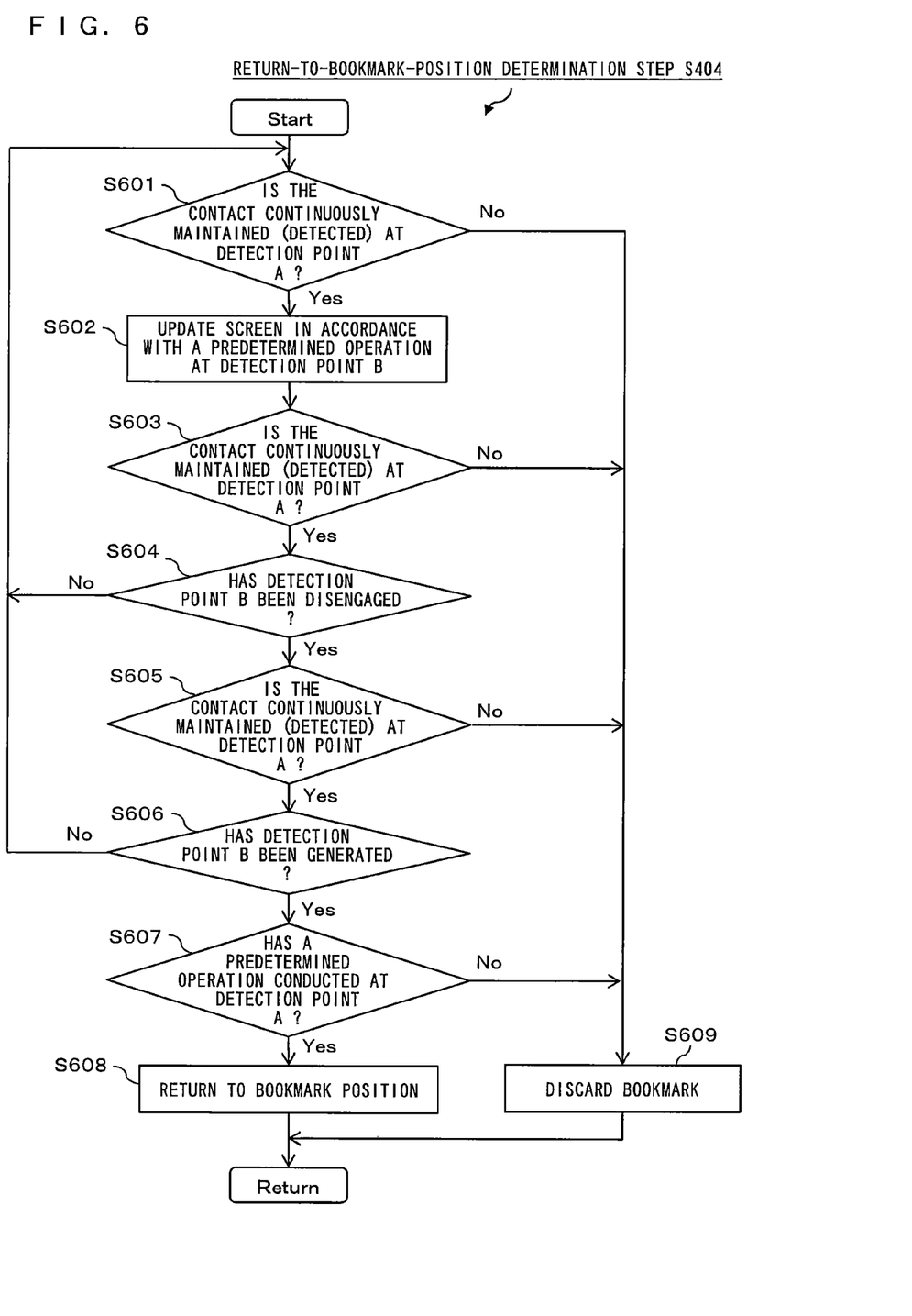
FIG. 6 is a flowchart showing one specific example of processes executed at a return-to-bookmark-position determination step S404.

After the bookmark position is configured at the bookmark-position configuration step S403, at the return-to-bookmark-position determination step S404, the return-to-bookmark-position determination section 303 determines to return the content displayed on the display section 206 to the bookmark position, based on the contact detected at the touch detection step S401. FIG. 6 is a flowchart showing one specific example of processes executed at the return-to-bookmark-position determination step S404. Here, descriptions are provided as having two points, detection points A and B, being simultaneously detected, and the detection point A being configured as the bookmark position at step S403.

At step S601, the return-to-bookmark-position determination section 303 determines whether or not the contact is maintained for the detection point A detected by the touch detection section 205. In other words, the return-to-bookmark-position determination section 303 determines whether the position (the detection point A) to which the contact is made on the touch panel 102 as a bookmark has been disengaged or moved.

Here, if the contact is maintained at the detection point A, the process advances to step S602 (Yes at step S601); and if the contact is not maintained at the detection point A, the process advances to step S609 (No at step S601).

At step S602, the return-to-bookmark-position determination section 303 (the control section 300) controls the content displayed on the display section 206 with regard to the detection point B detected by the touch detection section 205 based on a user operation on the detection point B. Specifically, the control section 300 controls, for example, scrolling and the like of the content displayed on the display section 206 with regard to the detection point B which is not configured as a bookmark, based on an instruction by the user operating the touch panel 102.

At step S603, the return-to-bookmark-position determination section 303 determines whether or not the contact is maintained with regard to the detection point A detected by the touch detection section 205. The process is similar to the process at step S601 described above.

Here, if the contact at the detection point A is maintained, the process advances to step S604 (Yes at step S603); and if the contact at the detection point A is not maintained, the process advances to step S609 (No at step S603).

At step S604, the return-to-bookmark-position determination section 303 determines whether the contact (operation) has been disengaged with regard to the detection point B detected by the touch detection section 205.

Specifically, with regard to the detection point B which is not configured as a bookmark, if there is an instruction by the user operating the touch panel 102, the process returns to step S601, and further, at step S602, the control section 300 controls, for example, scrolling or the like of the content displayed on the display section 206 based on the instruction by the user operating the touch panel 102 (No at step S604).

With regard to the detection point B which is not configured as a bookmark, if there is no instruction by the user operating the touch panel 102, the process advances to step S605 (Yes at step S604).

At step S605, the return-to-bookmark-position determination section 303 determines whether or not the contact is maintained with regard to the detection point A detected by the touch detection section 205. The process is similar to the process at step S601 described above.

At step S606, the return-to-bookmark-position determination section 303 determines whether the contact (operation) is made once again with regard to the detection point B detected by the touch detection section 205.

Specifically, with regard to the detection point B which is not configured as a bookmark, if there is an instruction by the user operating the touch panel 102 again, the process returns to step S601, and further, at step S602, the control section 300 controls, for example, scrolling or the like of the content displayed on the display section 206 based on the instruction by the user operating the touch panel 102 (No at step S606).

With regard to the detection point B which is not configured as a bookmark, if there is no further instruction by the user operating the touch panel 102, the process advances to step S607 (Yes at step S606).

At step S607, with regard to the detection point A detected by the touch detection section 205, the return-to-bookmark-position determination section 303 determines whether or not a predetermined operation to return the content displayed on the display section 206 to the bookmark position is conducted by the user operating the touch panel 102. The predetermined operation to return to the bookmark position may be, for example, an operation of slightly sliding the contact which has been maintained in a stationary manner at the detection point A without disengaging the contact from the touch panel 102, or an operation of strongly pushing the touch panel 102 once or more.

Here, if the predetermined operation to return to the bookmark position is conducted, the process advances to step S608 (Yes at step S607); and if the predetermined operation to return to the bookmark position is not conducted, the process advances to step S609 (No at step S607).

At step S608, the return-to-bookmark-position determination section 303 determines to return the content displayed on the display section 206 to the bookmark position configured at the bookmark-position configuration step S403.

At step S609, the return-to-bookmark-position determination section 303 discards information regarding the bookmark position configured at the bookmark-position configuration step S403, and determines not to operate the bookmark function.

As described above, it is determined whether or not to return to the bookmark position at step S608 and step S609 (step S404).

Then, if it is determined to return to the bookmark position at the return-to-bookmark-position determination step S404 (Yes at step S404), at the bookmark-position display step S405, the control section 300 returns the content displayed on the display section 206 to the bookmark position configured at the bookmark-position configuration step S403.

On the other hand, if it is determined not to return to the bookmark position at the return-to-bookmark-position determination step S404 (to discard information regarding the bookmark position configured at the bookmark-position configuration step S403) (No at step S404), for example, controls such as scrolling or the like of the content displayed on the display section 206 may be conducted based on the instruction by the user operating the touch panel 102.

Specifically described next is a manner in which the bookmark function is achieved on the contents display device 100 according to the one embodiment of the present invention by using the right and left hands.

Figure 7:
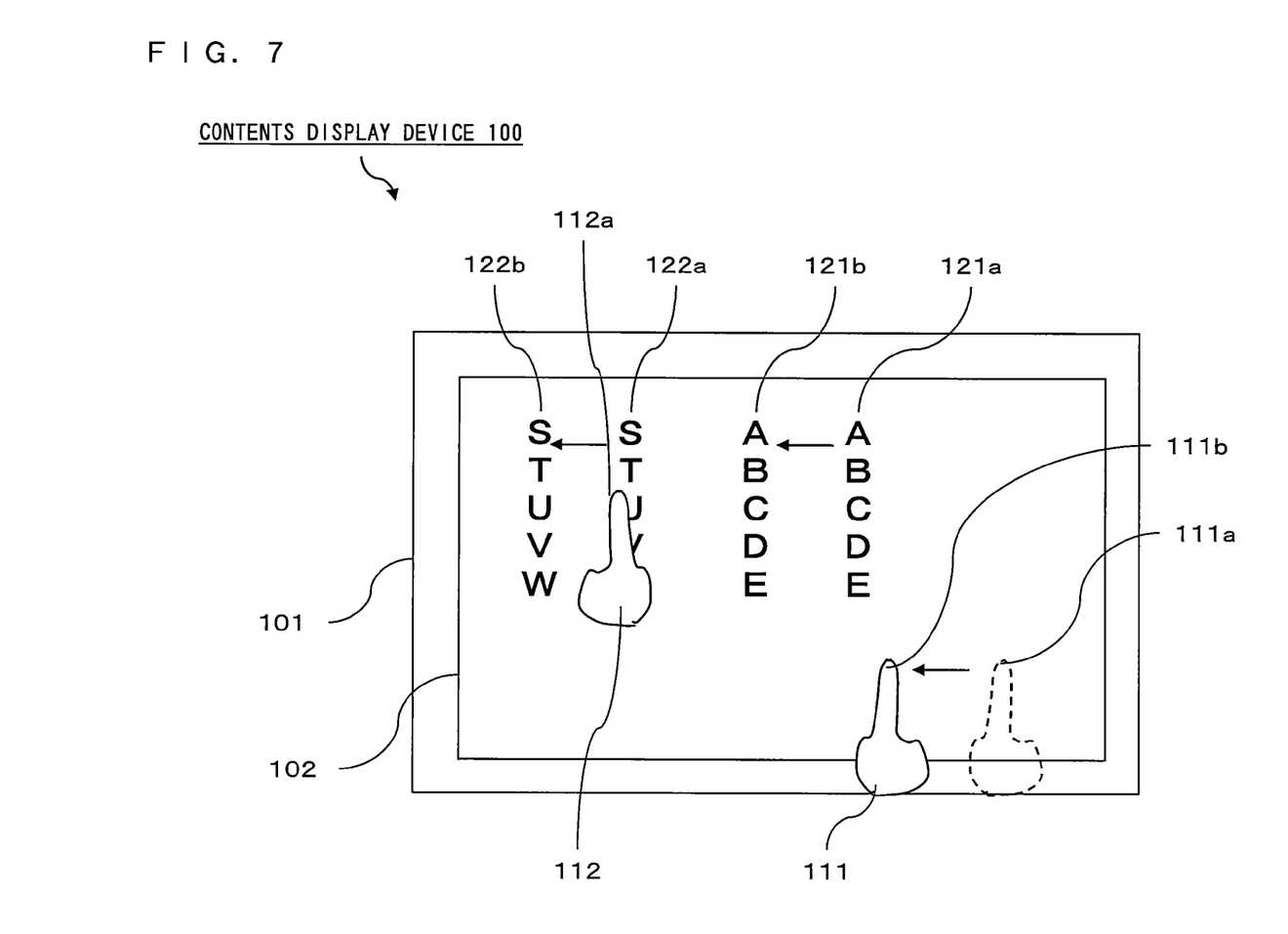
FIG. 7 schematically shows how a bookmark position is configured to the contents display device 100 according to the one embodiment of the present invention by using the right and left hands.

FIG. 7 schematically shows the manner how a bookmark position is configured to the contents display device 100 according to the one embodiment of the present invention by using the right and left hands. In FIG. 7, the touch panel 102 is disposed on the front surface of the display screen 101 of the contents display device 100; and a manner how the touch panel 102 is operated with a right hand 111 and a left hand 112 is shown.

On the display screen 101, "ABCDE" is displayed at a position 121a, and "STUVW" is displayed at a position 122a.

When the right hand 111 makes contact with the touch panel 102 and slides from a position 111a to a position 111b, the slide operation is detected by the touch detection section 205; and based on the slide operation, the control section 300 slides and displays the content displayed on the display section 206.

As a result, "ABCDE" displayed at the position 121a moves to a position 121b, and "STUVW" displayed at the position 122a moves to a position 122b.

It should be noted that the amount of movement of the display may be same as the amount of sliding by the right hand 111, or a small amount of sliding may result in a large amount of movement of the display.

Here, to achieve the bookmark function on the contents display device 100, a position 112a, which is in the vicinity of the position 122a and at which "STUVW" is displayed, is pressed by the left hand 112 before sliding the right hand 111 on the touch panel 102, i.e., while the right hand 111 is in contact with the position 111a. In this case, the touch detection section 205 simultaneously detects the contacts at the positions 111a and 112a as detection points (step S501).

When two detection points are simultaneously detected as described above, the bookmarking determination section 301 determines that either the position 111a or the position 112a is a bookmark. Here, since the contact at the position 112a is stationary (step S502), the bookmark-position configuration section 302 configures the position 112a as a bookmark position (step S503).

Then, when the bookmark position is confirmed, the position 122a of line "STUVW" which is the content indicated by the position 112a is stored and maintained as bookmark-position information on, for example, storage means including memory and the like (step S403).

In order to continuously hold the bookmark-position information stored in the storage means, it is necessary to keep pressing the position 112a without disengaging the left hand 112 from the touch panel 102 (step S601, step S603, step S605).

When the right hand 111 slides from the position 111a to the position 111b while the bookmark-position information is being held, the touch detection section 205 detects the slide operation; and based on the slide operation, the control section 300 slides and displays the content displayed on the display section 206. If the left hand 112 is disengaged from the touch panel 102 at this time point, the bookmark-position information is discarded (step S609).

On the other hand, when the position 122a on the touch panel 102 is pressed by the left hand 112 in a stationary manner, the bookmark-position information is held even if a slide operation is conducted by the right hand 111 to slide the screen display or even if the right hand 111 disengages from the touch panel 102. In this state, the right hand 111 may touch the touch panel 102 and continue the slide operation again (step S602, step S604, step S606).

Figure 8:
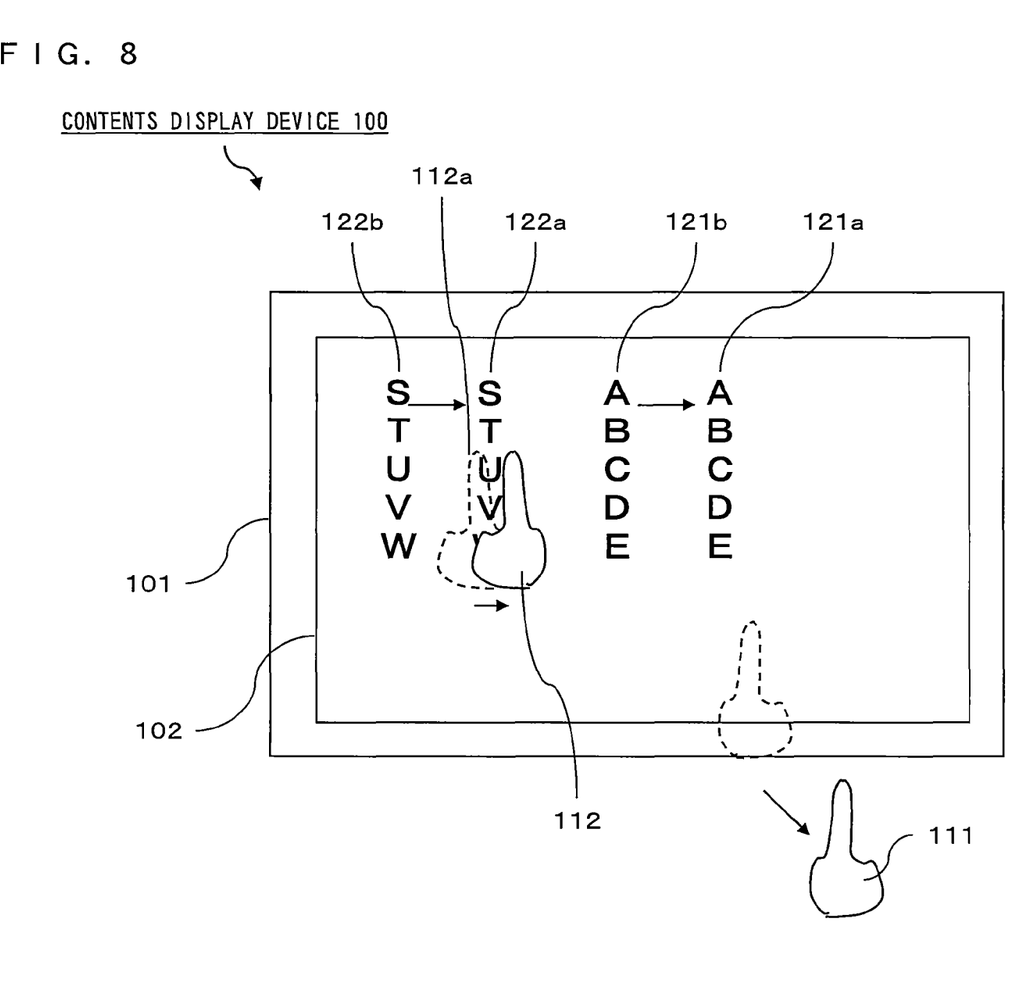
FIG. 8 schematically shows how the content displayed on a display screen 101 is returned to the configured bookmark position in the contents display device 100 according to the one embodiment of the present invention.

FIG. 8 schematically shows the manner how the content displayed on the display screen 101 is returned to the configured bookmark position in the contents display device 100 according to the one embodiment of the present invention.

In FIG. 8, the screen display is slid to display "ABCDE" and "STUVW" respectively at the position 121b and the position 122b. Then, the right hand 111 is disengaged from the touch panel 102 and the left hand 112 is slightly slid in a direction opposite to the slide direction to a position 112b without being disengaged from the touch panel 102 (step S607).

The return-to-bookmark-position determination section 303 determines to return the content displayed on the display section 206 to the bookmark position based on the slide operation to the opposite direction (step S608). Then, the control section 300 reads out the bookmark-position information held in the storage means, and displays images ("ABCDE" and "STUVW" respectively at the position 121a and the position 122a) of the bookmarked position on the display screen 101 (step S405).

As described above, with the contents display method 400 and the contents display device 100 according to the one embodiment of the present invention, the user can obtain an intuitive operability as if handling paper books, by having the bookmark position configured on a currently browsed portion of the content displayed on the display section 206, and returning the display to the configured bookmark position after the user examines earlier or later portions.

It should be noted that, in the one embodiment of the present invention, although two points in contact with the touch panel 102 are detected and one of the two is determined to be a bookmark, more contacts may be detected and multiple bookmarks may be configured.

Furthermore, in the one embodiment of the present invention, with regard to the operations of configuring the bookmark and returning to the bookmark position, although description of one example is provided with regard to a method of maintaining a bookmark position at the line level, it is needless to say that similar functions and advantageous effects can be obtained if the control is conducted at the word and page level.

Furthermore, in FIG. 7 and FIG. 8, although a lateral-direction slide operation is shown as an example; it is needless to say that similar functions and advantageous effects can be obtained with vertical (up-down) directions.

Furthermore, although descriptions have been provided for one example in which the displayed content change due to a slide operation by a hand (finger), the touch-panel control may be conducted in a method other than the slide operation.

In addition, in the one embodiment of the present invention, although the touch panel 102 is operated by using a hand (finger), for example, a pen and the like may be used.

While the invention has been described in detail, the foregoing description is in all aspects illustrative and not restrictive. It will be understood that numerous other modifications and variations can be devised without departing from the scope of the invention.

What is claimed is:

1. A contents display device for displaying content, the contents display device comprising:
    a display section having a single screen on which content is displayed;

a touch detection section, superposed on the single screen of the display section, for detecting contact instances that operate content displayed on the display section; and a control section for controlling the content displayed on the display section, based on contact instances detected by the touch detection section, wherein the control section includes:

a bookmarking determination section for, provided that multiple contact instances on the single screen have been simultaneously detected by the touch detection section, determining for the simultaneously detected multiple contact instances whether or not each simultaneously detected contact instance is stationary for a predetermined period in a region, of the display section, in which the content is displayed, and determining that a simultaneously detected contact instance that is determined to be stationary for the predetermined period is a bookmarking contact instance;

a bookmark-position configuration section for configuring a bookmark position in the content displayed on the display section, based on the bookmarking contact instance; and a return-to-bookmark-position determination section for, after the bookmark position has been configured by the bookmark-position configuration section, provided that the touch detection section detects that a position of the bookmarking contact instance has slid, determining to return the content displayed on the display section to the bookmark position, and when the return-to-bookmark-position determination section has made the determination to return to the bookmark position, for returning the content displayed on the display section to the bookmark position configured by the bookmark-position configuration section, wherein when the touch detection section has simultaneously detected multiple contact instances, the touch detection section samples coordinate position of the multiple contact instances multiple times within a predetermined time period; and the bookmarking determination section determines whether each simultaneously detected contact instance is stationary on the condition that the coordinate position of the simultaneously detected contact instance does not change having been sampled for the multiple times within the predetermined time period.

2. The contents display device according to claim 1, wherein the control section scrolls the content displayed on the display section, based either on none of the contact instances detected by the touch detection section being simultaneously detected, or on none of any simultaneously detected contact instances being determined to be stationary for the predetermined period.

3. The contents display device according to claim 1, wherein during the interval the bookmarking contact instance is maintained, the bookmark-position configuration section continues maintaining the bookmark position configured based on the bookmarking contact instance, and once the bookmarking contact instance is broken, the bookmark-position configuration section releases the bookmark position configured based on the bookmarking contact instance.

4. The contents display device according to claim 3, wherein, during the interval the bookmarking contact instance is maintained, the control section scrolls the content displayed on the display section, based on one of the simultaneously detected contact instances not having been determined by the bookmarking determination section to be the bookmarking contact instance.

5. A contents display method executed by a contents display device for displaying content on a display section having a single screen, the method comprising:

a touch detection step of detecting a contact instance that operates content displayed on the single screen of the display section;

a bookmarking determination step of, provided that multiple contact instances on the single screen have been simultaneously detected in the touch detection step, determining for the simultaneously detected multiple contact instances whether or not each contact simultaneously detected instance is stationary for a predetermined period in a region, of the display section, in which the content is displayed, and determining that a simultaneously detected contact instance that is determined to be stationary for the predetermined period is a bookmarking contact instance;

a bookmark-position configuration step of configuring a bookmark position in the content displayed on the display section, based on the bookmarking contact instance;

a return-to-bookmark-position determination step of, after the bookmark position has been configured in the bookmark-position configuration step, provided that it is detected that a position of the bookmarking contact instance has slid, determining to return the content displayed on the display section to the bookmark position; and a bookmark-position display step of returning the content displayed on the display section to the bookmark position configured in the bookmark-position configuration step, when the determination to return to the bookmark position has been made in the return-to-bookmark-position determination step; wherein when the touch detection step simultaneously detects multiple contact instances, multiple samples of the coordinate position of the multiple contact instances are taken multiple times within a predetermined time period; and the bookmarking determination step determines whether each simultaneously detected contact instance is stationary on the condition that the coordinate position of the simultaneously detected contact instance does not change having been sampled for the multiple times within the predetermined time period.

* * * * *